United States Patent [19]

Stoyle

[11] Patent Number: 5,051,749
[45] Date of Patent: Sep. 24, 1991

[54] SYNTHETIC APERTURE RADAR ASSEMBLY AND A METHOD OF CREATING A RADAR IMAGE OF A PLANET SURFACE USING SUCH AN ASSEMBLY

[75] Inventor: Peter N. R. Stoyle, Bristol, United Kingdom

[73] Assignee: British Aerospace Public Limited Company, London, England

[21] Appl. No.: 489,185

[22] Filed: Mar. 8, 1990

[30] Foreign Application Priority Data

Mar. 21, 1989 [GB] United Kingdom ............... 8906520

[51] Int. Cl.⁵ .................... G01S 13/90; G01S 13/22
[52] U.S. Cl. ........................................ 342/25; 342/137
[58] Field of Search ............................. 342/25, 137

[56] References Cited

U.S. PATENT DOCUMENTS 4,064,510 12/1977 Chabah ........................... 342/25 X
4,706,089 11/1987 Weindling ........................ 342/25

FOREIGN PATENT DOCUMENTS 3430749 3/1986 Fed. Rep. of Germany ........ 342/25

Primary Examiner—Gilberto Barrón, Jr.
Attorney, Agent, or Firm—Cushman, Darby & Cushman

[57] ABSTRACT

A synthetic aperture radar assembly (1) locatable on a satellite (2) for radar imaging of a planet surface (3) in swaths, including means (8) for transmitting pulses (4) of electromagnetic radiation towards the planet surface (3) to be imaged, means (8) for receiving echoes of said pulses (4) returned by said planet surface (3), means for creating an image of a swath (5) of said planet surface (3) from said returned echoes and means for randomly varying the frequency of transmission of said pulses (4) to increase the width (11) of swath (5) imagable.

10 Claims, 3 Drawing Sheets

SYNTHETIC APERTURE RADAR ASSEMBLY AND A METHOD OF CREATING A RADAR IMAGE OF A PLANET SURFACE USING SUCH AN ASSEMBLY

FIELD OF THE INVENTION

This invention relates to a synthetic aperture radar assembly locatable on a satellite for radar imaging of a surface of a planet, such as Earth, in swaths and to a method of creating a radar image of a surface of a planet, such as Earth, in swaths using such an assembly.

BACKGROUND OF THE INVENTION

A conventional high resolution imaging Synthetic Aperture Radar (SAR) flown on a spacecraft such as a satellite operates by transmitting pulses of electromagnetic radiation at regular intervals towards the surface of a planet such as Earth being imaged. Then basically it measures the time required for different parts of the echo to return from the surface and from this creates an image of the swath of surface to which the pulses have been transmitted. The swaths which are resolved are long narrow strips on the ground.

Such a conventional high resolution imaging Synthetic Aperture Radar (SAR) flown on a spacecraft such as a satellite has a major disadvantage when used for planet surveillance purposes. This is because the imaged swath width is limited by theoretical considerations to approximately 150 km for a 15 m antenna as antennas longer than this are very difficult to build in space. For a single spacecraft, such as a satellite, this means that it would take more than two days to cover the surface of the Earth. By scanning the SAR beam of pulses in the across-track direction, it is possible to get some increase of the imaging swath width, but this is directly at the expense of resolution in the along-track direction. It is however not possible to scan out to high incidence angles towards the planet horizon without the swath becoming ambiguous, which is essentially an aliassing problem caused by undersampling, Thus scenes at different ranges become superimposed or folded on top of each other with accompanying problems of resolution.

OBJECTS OF THE INVENTION

Thus one object of the present invention is to provide a generally improved synthetic aperture radar assembly for creating a radar image of a planet surface so as to allow an increased width of swath to be covered.

A further object of the present invention is to provide a method of creating a radar image of a planet surface using such an assembly, which allows an increased width of swath to be covered.

These and other objects and advantages of the present invention will become more apparent from details disclosed in the following specification where preferred embodiments of the invention are disclosed.

SUMMARY OF THE INVENTION

According to one aspect of the present invention there is provided a synthetic aperture radar assembly locatable on a satellite for radar imaging of a planet surface in swaths, including means for transmitting pulses of electromagnetic radiation towards the planet surface to be imaged, means for receiving echoes of said pulses returned by said planet surface, means for creating an image of a swath of said planet surface from said returned echoes, and means for randomly varying the frequency of transmission of said pulses to increase the width of swath imagable.

Preferably the assembly includes means for scanning the transmitted pulses over the planet surface in a direction along the track of said swath and in a direction across the width of the swath transverse to the track.

According to another aspect of the present invention there is provided a method of creating a radar image of a planet surface in swaths, including the steps of transmitting pulses of electromagnetic radiation from a satellite towards the planet surface to be imaged, receiving echoes of said pulses returned by said planet surface, creating an image of a swath of said planet surface from the returned echoes and randomly varying the frequency of transmission of said pulses to increase the width of swath imagable.

Conveniently the method includes the step of scanning the transmitted pulses over the planet surface in a direction along the track of said swath and in a direction across the width of the swath transverse to the track.

DESCRIPTION OF THE DRAWINGS

For a better understanding of the present invention and to show how the same may be carried into effect, reference will now be made, by way of example, to the accompanying drawings, in which.

DESCRIPTION OF THE EMBODIMENTS OF THE INVENTION

Figure 1:
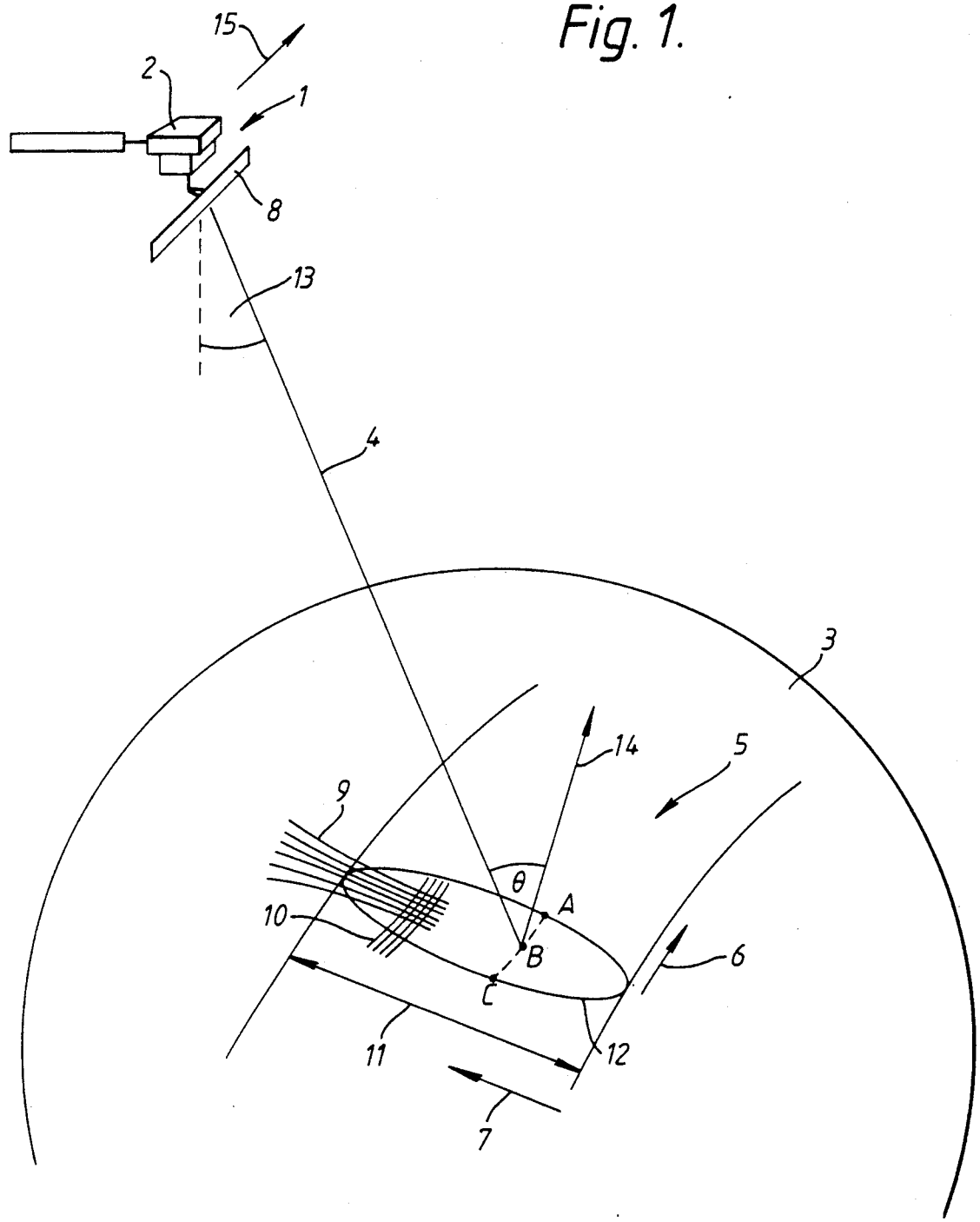
FIG. 1 is a diagrammatic illustration of the general geometrical relationship between a synthetic aperture radar assembly according to the invention carried on a satellite and a surface of a planet being imaged.

A generalised illustration of the geometrical relationship between a synthetic aperture radar assembly generally indicated at 1, of the present invention carried on a satellite 2 and a surface 3 of a planet such as Earth being imaged, as shown in FIG. 1 is also generally applicable to a conventional synthetic aperture radar assembly.

CONVENTIONAL SYNTHETIC APERTURE RADAR

The conventional synthetic aperture radar (SAR) operates by sending out or transmitting pulses 4 of electromagnetic radiation at regular intervals to a surface to be imaged. It measures essentially the length of time required for different parts of the echo to return from the surface 3. These times t are proportional to ranges R.

$$t = 2R/C \tag{1}$$

where C=speed of light.

$$\text{The range resolution} = (C\tau/2) \quad (2)$$

where $\tau$ is the compressed pulse length.

The range cells which are resolved are long narrow strips such as 5 on the ground surface 3 if the surface being imaged is Earth.

To get two dimensional resolution, it is necessary also to be able to resolve in the along-track direction 6 as well as in the across-track or range direction 7. Now as the satellite 2 moves, the pulse beam 4 travels along the ground 3. With reference to FIG. 1, a point A just entering the beam has a positive range rate r and hence a positive Doppler frequency $(2r/\lambda)$ with respect to the satellite 2.

A point B in the middle of the beam is stationary (zero Doppler) and a point C leaving the beam has a negative Doppler. The Doppler 'history' of any given point on the ground is thus a ramp in frequency.

The span of Doppler frequency 'subtended' by the beam is $$B_{Dop} = \frac{KV_{s/c}}{L_{ant}} \quad (3)$$

where
$K \approx 1$ is a factor dependent on antenna pattern,
$L_{ant}$=Length of antenna 8,
$V_{s/c}$=Spacecraft Velocity.

Points such as A,B,C can in principle be resolved by tracking these Doppler ramps with a Doppler filter. The minimum bandwidth of such a filter is $1/T_{ob}$ where $T_{ob}$ is the maximum SAR observation or integration time, i.e: the length of time a point on the ground stamp in the SAR beam. The number of points in the along track direction 6 which can be resolved in this way is:

$$N = B_{Dop}/1/T_{ob} \quad (4)$$

and the along-track or azimuth resolution $C_{az}$ is therefore the (Azimuth × Beamwidth on Ground/N) which can be simplified to $$C_{az} \approx L_{ant}/2 \quad (5)$$

The above process with tracking filters is equivalent to digitally correlating the content of a given range cell from successive echoes with a Doppler reference ramp, digitally sampled at the radar regular Pulse Repetition Frequency or PRF.

In FIG. 1 are shown lines 9 of equal Doppler (hyperbolae) and lines 10 of equal range (circles). The strips 5 have an images swath width 11 equal to the width of the SAR beam whose outline is shown at 12. The pulses 4 are sent out from the assembly 1 at a look angle 13 and strike the ground 3 at an angle $\theta$ to the local vertical 14. The satellite 2 moves in a direction 15.

The desired best azimuth resolution of the assembly 1 determines the length of the antenna 8 as roughly $2 \times C_{az}$ by relationship 5.

Antenna length then gives rise to an azimuth beam which when projected on the ground 3 subtends a Doppler bandwidth of $$B_{Dop} = KV_{s/c}/L_{ant} \quad (6)$$

By the classic Nyquist sampling theorem the PRF must then be greater than this two-sided bandwidth to avoid aliassing or fold-over of the signal.

Thus there exists a Minimum PRF $$PRF_{MIN} = K'B_{Dop} = \frac{K'K\,V_{s/c}}{L_{ant}} \quad (7)$$

where K' is an oversampling factor chosen typically to be about 1.3 to limit aliassed energy to a low level.

Stated another way, between transmitted pulses there is a maximum echo length which can be received, which is some fraction of PRIMAX, i.e. PRIMAX/$K_{elamb}$, where PRIMAX=1/PRFMIN.

The factor $K_{elamb}$ is typically in the range of from 1.3 to 1.8 depending on the across-track beamshape which can be formed from the width aperture of the SAR antenna.

The start of the echo from the imaged swath arrived at time $$t = 2R_{near}/C \quad (8)$$

where $R_{near}$, $R_{far}$ are near and far swath ranges.

In order to have the echo fit in between transmit pulses, the following relationship should apply:

$$\frac{2\Delta R}{C} < \frac{PRIMAX}{K_{elamb}} \quad (9)$$

$$\Delta R < \frac{C}{2\,K_{elamb}} \cdot PRIMAX = \quad (10)$$

$$\frac{C}{2\,K_{elamb}} \cdot PRFMIN = \frac{C}{2} \frac{L_{ant}}{K_{elamb}} KK'$$

where $\Delta R$ is the swath width in range.

Figure 2:
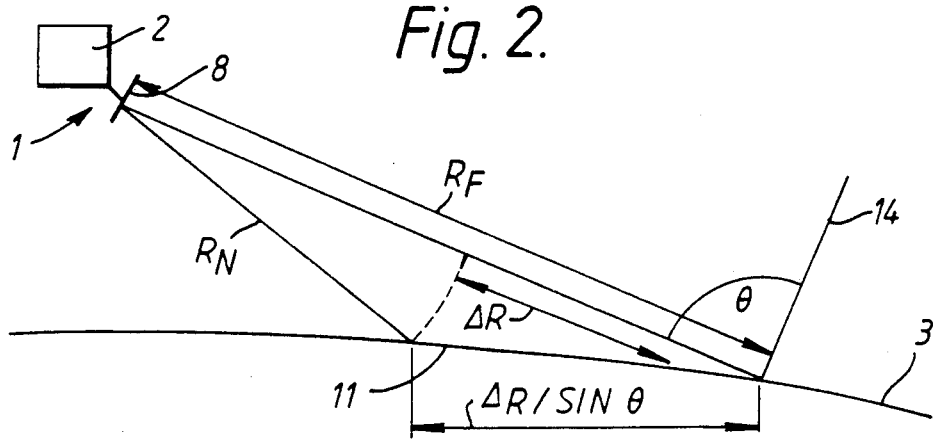
FIG. 2 is a diagrammatic illustration of the geometrical relationship between a conventional synthetic aperture radar assembly carried on a satellite and a surface of a planet being imaged.

This is illustrated geometrically in FIG. 2, where $R_{near}$ is shown as $R_N$ and $R_{far}$ as $R_F$.

The maximum ground projected swath width attainable, the so-called ambiguity swath width, is $$R^{MAX}/\sin\theta\,\alpha \quad \begin{array}{c} C_{az} \\ \text{or } L_{ant} \end{array} \quad (11)$$

Thus with a conventional regular pulse frequency synthetic aperture radar the swath width attainable at a given resolution $C_{az}$ is limited. The size of the antenna 8 is also a limiting factor with a conventional SAR.

The antenna 'width' or 'height' is normally chosen to be wide enough to illuminate various possible swath widths at different incidence angles $\theta$, the worst case being usually at far swath (narrowest beam, widest aperture requirement). Thus the fact that the antenna width is normally limited to two or three meters maximum for reasons of stowage, deployment, mass etc. determines the maximum incidence angle $\theta_{max}$ which can be accessed by a conventional SAR having a steerable beam in the across-track direction.

Although the electrical beam steering may be able nominally to exceed this limit, the SAR imaging would degrade because of aliassing. On the contrary, the synthetic aperture radar assembly 1 of the present invention deliberately exploits this aliassing effect.

Figure 3:
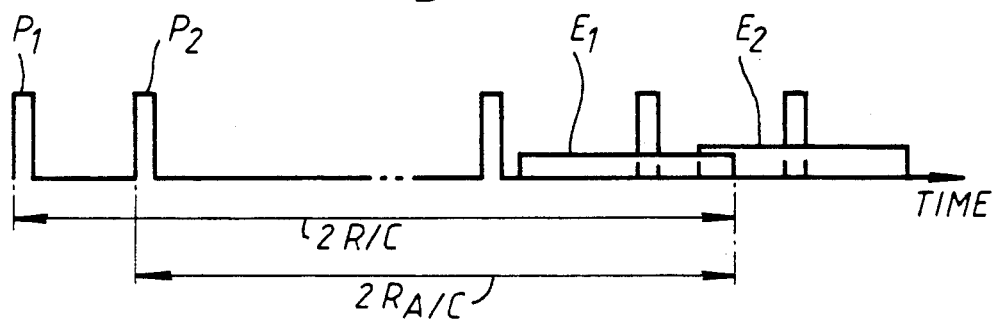
FIG. 3 is a schematic illustration of range ambiguity for a conventional synthetic aperture radar, showing the positions of pulses and pulse echoes with time.

If a SAR beam that is already illuminating an ambiguity limited maximal swath is broadened out the echo length $2\,R/C$ will be greater that the PRI, so that the echo from range R at far swath now coincides with an echo return (from the following transmit pulse) at range $R_A$, where $R_A$ is the range at ambiguity. Thus $$\frac{2R}{c} - PRI = \frac{2R_A}{c} \quad (12)$$

as can be seen from FIG. 3, where $P_1$ is the first pulse, $P_2$ the second pulse, $E_1$ the echo from $P_1$ and $E_2$ the echo from $P_2$.

Thus a range separated by $$c\frac{PRI}{2}$$

will be imaged on top of the range being processed. This is known as a range ambiguity. If, for example, an ocean scene is processed at range R, the echo return from a ship which might be present at range $R - C$ $PRI/2$ will be superimposed or folded on top of R and hence will appear (wrongly) to be at range R (as long as the PRI remains constant, which it is for a conventional constant PRF SAR).

SYNTHETIC APERTURE RADAR OF THE INVENTION

Figure 4:
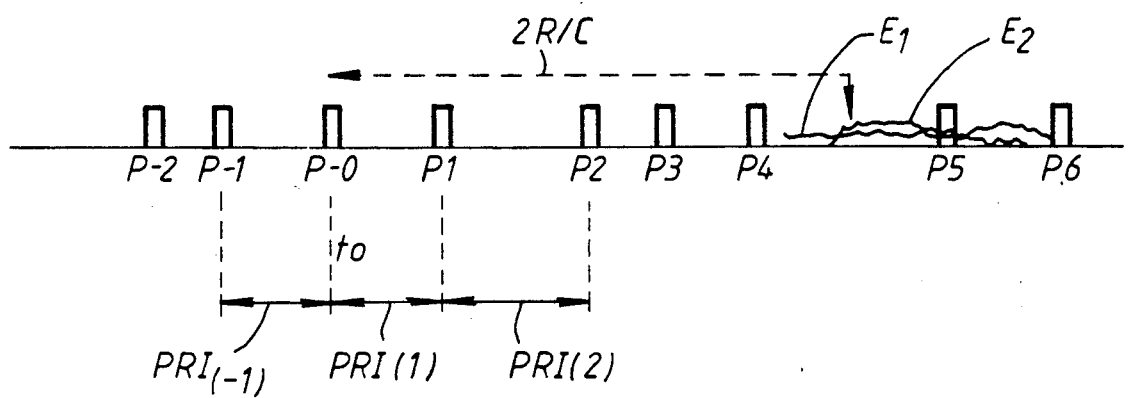
FIG. 4 is a schematic illustration of the positions of pulses and pulse echoes with time, under the conditions of FIG. 3, but when produced using an assembly of the present invention.

Making the pulse repetition frequency (PRF) random according to the assembly and method of the present invention, with for example the occurrence of a transmitted pulse being Poisson distributed, while keeping the same average value of $$PRF = \frac{K'K V_{s/c}}{L_{ant}}$$

improves the swath width obtainable with good resolution. As shown in FIG. 4, the pulses are referenced $P_{-2}$, $P_{-1}$, $P_1$, $P_2$ etc. with the echo from pulse $P_1$ being $E_1$ and that from $P_2$ being $E_2$.

Let the echo magnitude at the time t due to the reflection of pulse K from the illuminated swath be $S_K(t)$.

If a range R is being processed there will be the wanted echo $$S_o\frac{(2R)}{c}$$

and also ambiguous superimposed echoes $$S_1(2R/c - PRI(1)), \quad S_{-1}(2R/c + PRI(-1)),$$
$$t_{+1} \qquad\qquad\qquad t_{-1}$$

$$S_2(2R/c - (PRI(1) + PRI(2)),$$
$$t_{+2}$$

etc, including all terms for which the ambiguous range $$R_j = \frac{2 \, t_j}{c} \quad (13)$$

falls within the ranges encompassed within the illuminated swath.

If the swath width is M=4 times wider say than an ambiguity limited swath for a conventional SAR having the same antenna length, then there will be four significantly contributing terms in the sum echo $$s(t_o) = \ldots + S_{-2}(t_{-2}) + S_{-1}(t_{-1}) + S_o\frac{(2R)}{c} + S_1(t_1) + \ldots \quad (14)$$

where $t_o = 2R/c$.

On average three ambiguous ranges are folding on top of the range R being processed.

Take for example the first ambiguous range return $S_1(t_1)$ above. Now ambiguous range $R_1$:

$$R_1 = R - \frac{c}{2} \cdot PRI(1) \quad (15)$$

which is different on every pulse. Thus ambiguities range from one echo to the next. Generally hundreds of echoes are integrated to form the final image, so a bright target such as a ship at an ambiguous range $R_{ship}$ will be jittered or smeared over the whole image and so its energy or intensity in the final image will be dissipated down to well below noise level. It will consequently not be imaged except when that range becomes the processed range (see FIG. 5 concerning range timing) as opposed to an ambiguous range.

Figure 5:
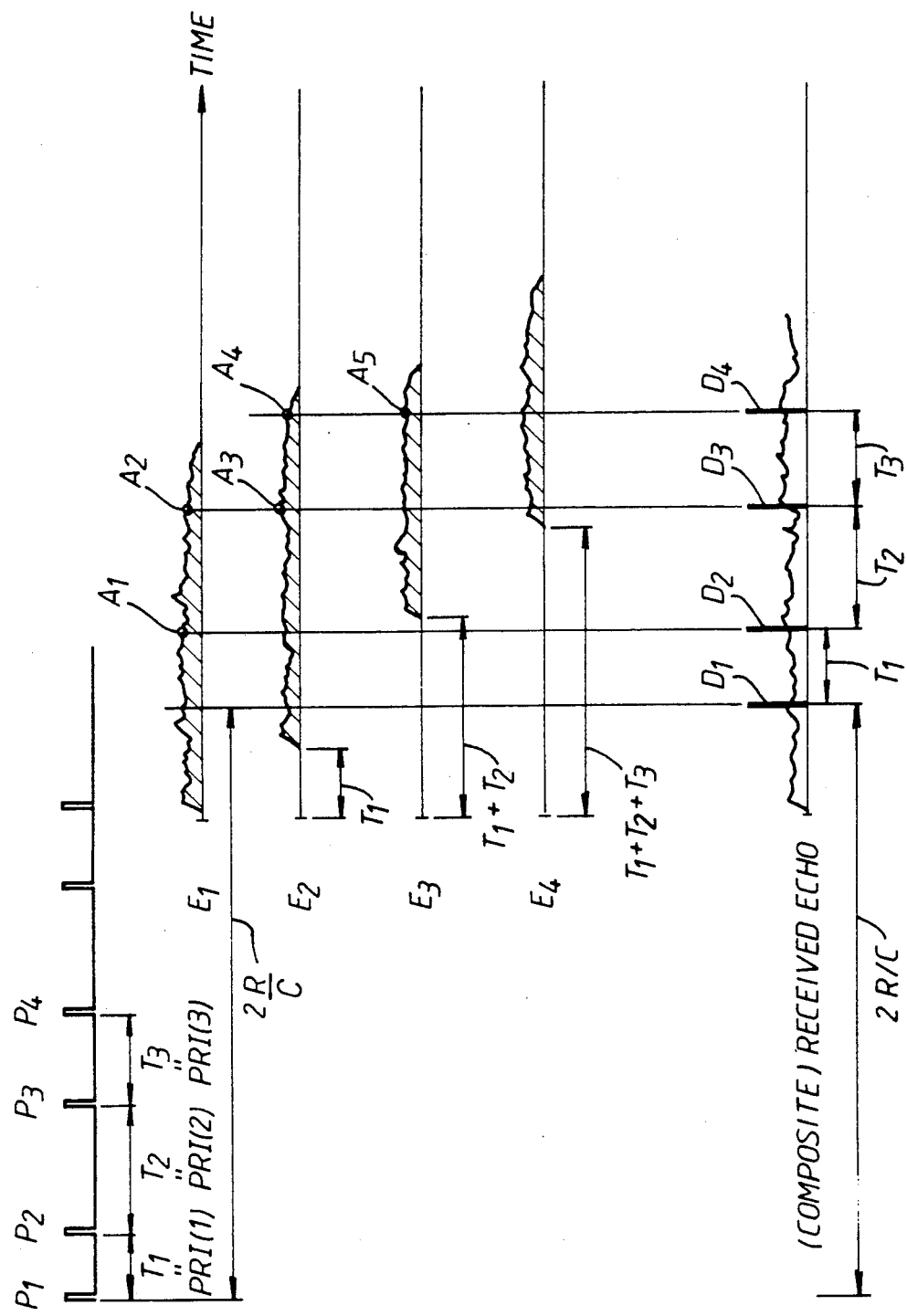
FIG. 5 is a diagrammatic illustration of range timing and processing carried out using a synthetic aperture radar assembly according to the present invention.

In FIG. 5, $E_1$ is the echo from pulse $P_1$, $E_2$ the echo from pulse $P_2$, $E_3$ the echo from pulse $P_3$, $E_4$ the echo from pulse $P_4$, $A_1$ the ambiguity at range $$R + \frac{cT_1}{2},$$

$A_2$ the ambiguity at range $$R + \frac{c(T_1 + T_2)}{2},$$

$A_3$ the ambiguity at range $$R + \frac{cT_2}{2}, A_4$$

the ambiguity at range $$R + \frac{c(T_2 + T_3)}{2},$$

$A_5$ the ambiguity at range $$R + \frac{cT_3}{2}$$

and $D_1$, $D_2$, $D_3$, $D_4$ the points loaded into range cell corresponding to range R, ready for azimuth processing. The range timing is from when the first pulse $P_1$ contributing to the current section of the echo was transmitted. Similarly distributed targets at ambiguous ranges such as forest, fields, mountains etc. will be fairly uniformly smeared for a highly random PRF and will contribute to the image background at a level equal to $M - 1 = 3$ times the average reflectivity of the swaths illuminated in the beam.

DETECTION OF HARD TARGETS AT HIGH INCIDENCE ANGLES

The last sentence of the last paragraph gives essentially the reason why high incidence angles are preferred for random PRF mode operation. At high incidence angles greater than 40° or 50°, terrain and ocean reflectives tend to drop off to very low levels (0° in the range −20° to −40°) so even a conventional SAR could not hope to image these areas at a positive SNR (Signal to Noise Ratio). With a random PRF SAR, several ambiguous regions of very low average $\sigma°$ folding on top of each other will give a composite return of low effective $\sigma°$, in the region of noise level.

Now bright metallic targets will have an effective reflectivity typically about 25 dB above noise level, and as a margin of about 12 dB is needed for fairly reliable target detection (via thresholding) against combined terrain clutter plus noise plus folded ambiguity energy, it will be seen that hard targets will still be readily detectable by a random PRF SAR. However, the random PRF swath should not be broadened too much or else the average ambiguity energy level in the image will rise and begin to affect detectability. More importantly, however, the antenna gain will fall as the beam is broadened. This fact combined with the long range to near horizon target would adversely effect the detectional Signal to Noise, at least on the less visible hard targets with small to medium radar cross section.

To make a rough estimate of the smeared background equivalent $\sigma°$ in the random PRF image, it is easy to see that if there is a random PRF mode beam which is M times as broad in elevation as the ambiguity limited beam size would be (if it were possible to synthesise it from the given aperture), then on average M−1 sub-swaths of ambiguity limited size will fold on each other in range. When the average PRF used is Average PRF = PRF = PRF of the system in non-random mode, the azimuth ambiguity energy is on average equal in intensity to the images scene + range ambiguity energy, so in effect the composite reflectivity is about 2M times the average reflectivity over the while illuminated swath.

In the azimuth processing which follows range compression and re-ordering, the Doppler return from a point on the ground is formally a Doppler ramp which for conventional SAR is sampled at the equally spaced times that pulses are sent out, and is used as a digital correlation reference for the azimuth processing. The same Doppler ramp exists of course in the random PRF mode of the invention, except that it is now sampled at the times that the random PRF pulses are sent out. In antenna terms, a synthetic antenna is built up as the spacecraft travels along with a random spacing (averaging to about $L_{ant}/2$) requiring the focusing phase corrections implicit in the randomly sampled reference ramp. The standard azimuth correlation processing will now correlate the received echoes in a given range cell with this randomly sampled reference.

There are, as with conventional constant PRF SAR, various ways that the correlation can be carried out. For example, it can be done directly or the two functions to be correlated can be Fast Fourier Transformed, multiplied together in the frequency domain and Inverse Fast Fourier Transformed. However, in conventional SAR there is a shortcut in the processing in that the azimuth reference function remains the same as time progresses. For the random PRF of the invention however, the form of the azimuth reference ramp is continually changing as new random samples come in and are added onto the end of the digital reference ramp and old ones drop out. In the Fourier transform domain, a single Fourier transformed reference function cannot be held only, but it is necessary to Fourier transform the time domain reference function afresh for each distinct azimuth resolution cell formed in processing. With the advent of very high speed correlators, it would be sufficient to use just one bit for digitising random PRF raw data, which means very simple and fast digital correlators can be used. The data rate for random PRF is no higher than for conventional steered/scanned SAR and with just one bit digitisation it would be three or four times less than a conventional SAR data rate of about 200M bib/sec.

Thus by making the Pulse Repetition Frequency (PRF) randomly variable according to the present invention, it becomes possible to image a much wider swath 5 without loss of along-track resolution. There may be loss of radiometric resolution in the sense that imaging of low reflectivity targets could be impaired. However, bright targets or so-called hard targets (e.g. ships on the ocean) will show up as well as with conventional SAR. Random PRF is particularly well suited to imaging the region which extends from the normal ambiguity imposed limit of scan of a SAR (approximately 55° for a typical C-band system with a 3 m × 10 m antenna) out to the horizon (90° incidence angle). This adds potentially approximately another 2,000 km to the SAR swath width which can be accessed by scanning. The actual imaged swath width (assuming no scanning) would be between approximately 300 and 600 km depending on the incidence angle.

Assuming that scanning is employed, it is possible to image a swath of approximately 2,300 km wide, which is approaching the figure required for global coverage above latitude 30° N every twelve hours from a single satellite.

Random PRF preferably is operated as a mode of SAR operation into which a conventional beam steerable SAR can be switched at any time, if a wide swath width with hard target detection and locating capability is required, and if the somewhat degraded imagery of uniform scenes or so-called distributed targets does not matter. Random PRF mode is compatible with almost any other mode of SAR, such as scanning, spotlighting, high range resolution polarisation and dual frequency.

Various modifications and alterations may be made to the embodiments of the present invention described and illustrated, within the scope of the present invention as defined in the following claims.

What is claimed is:

1. A synthetic aperture radar assembly locatable on a satellite for radar imaging of a planet surface in swaths, comprising:
   means for transmitting pulses of electromagnetic radiation towards the planet surface to be imaged in widths of swaths to be imaged,
   timing means, coupled to said transmitting means, for randomly varying the frequency of transmission of said pulses to increase the width of swath imageable;
   means for receiving echoes of said pulses returned by said planet surface, and
   means for creating an image of a swath of said planet surface from said returned echoes.

2. As assembly according to claim 1, further comprising means for scanning the transmitted pulses over the planet surface in a direction along a track of said swath and in a direction across the width of the swath transverse to the track.

3. A method of creating a radar image of a planet surface in swaths, comprising the steps of:
  transmitting pulses of electromagnetic radiation from a satellite towards the planet surface to be imaged in widths of swaths to be imaged,
  randomly varying the frequency of transmission of said pulses to increase the width of swath imageable,
  receiving echoes of said pulses returned by said planet surface, and
  creating an image of a swath of said planet surface from the returned echoes.

4. A method according to claim 3, further comprising the step of scanning the transmitted pulses over the planet surface in a direction along a track of said swath and in a direction across the width of the swath transverse to the track.

5. An assembly as in claim 1 wherein said width of said swaths to be imaged is wider than an ambiguity limited swath width.

6. An assembly as in claim 5 wherein said image creating means includes means for summing a plurality of said echoes to average ambiguities to below noise level.

7. An assembly as in claim 1 wherein said timing means uses a random varying PRF such that a mean PRF remains constant.

8. A method as in claim 3 wherein said width of said swaths to be imaged is wider than an ambiguity limited swath width.

9. A method as in claim 8 wherein said image creating step includes the step of summing a plurality of said echoes to average ambiguities to below noise level.

10. A method as in claim 3 wherein said timing means uses a random varying PRF such that a mean PRF remains constant.

* * * * *